Patented Dec. 15, 1936

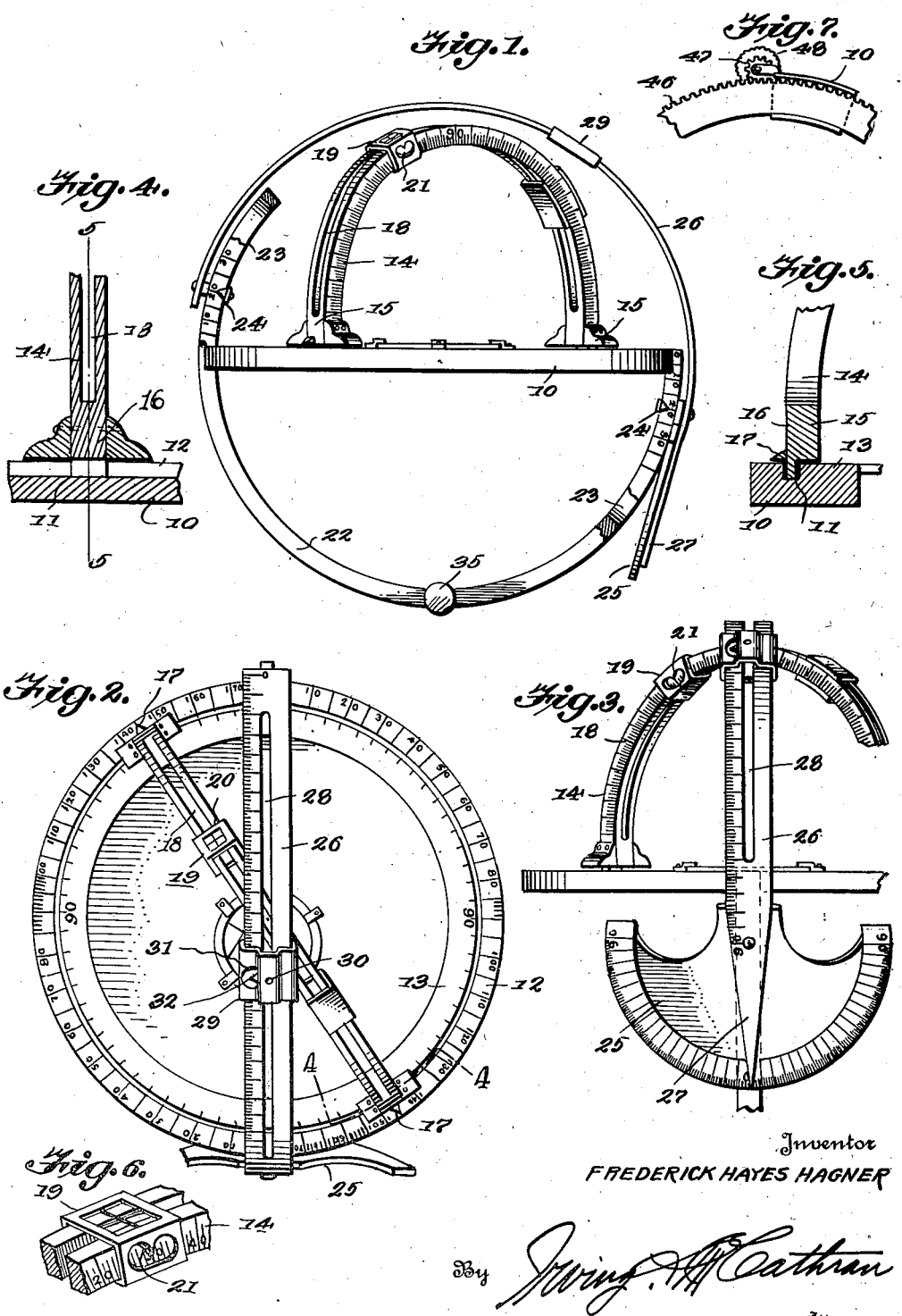

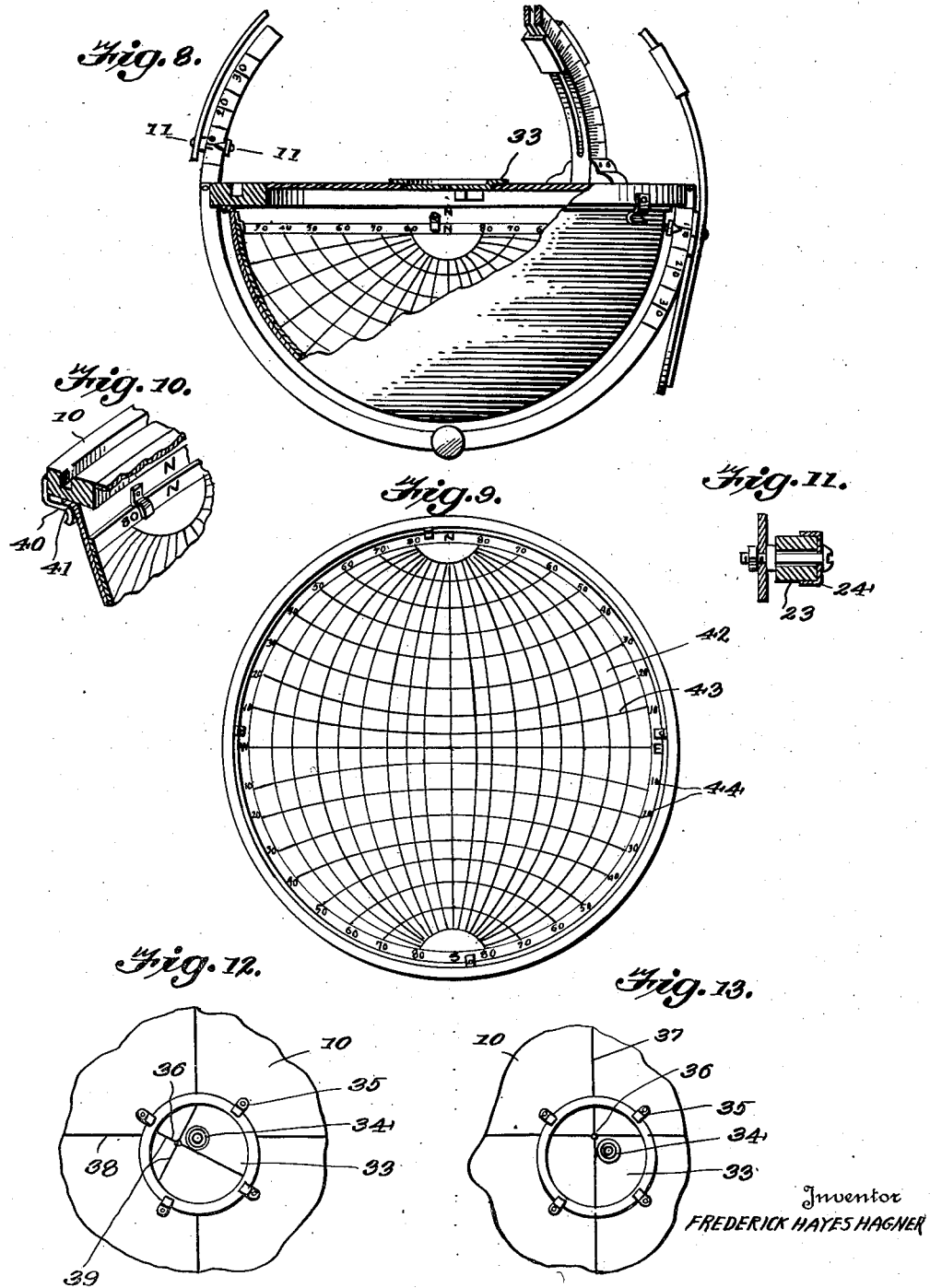

2,064,061

UNITED STATES PATENT OFFICE 2,064,061

POSITION FINDER

Frederick Hayes Hagner, San Antonio, Tex., assignor to Position Finder Corporation, San Antonio, Tex., a corporation of Texas Application June 23, 1933, Serial No. 677,317

22 Claims. (Cl. 33—1)

This invention relates to navigating instruments and has special reference to a position finder.

It is a well recognized fact that the position of any point on the surface of the earth, as measured in functions of latitude and longitude, may be determined from solar or astral observations, due reference being had to the azimuth and hour angles of the observed body or bodies. It is also well recognized that these are compilations, such as the Nautical Almanac, giving the necessary information from which observations taken with such an instrument as a quadrant can be correctly used to determine such point position by mathematical computation. However, such computations are somewhat involved and there always exists the possibility of computation errors.

One important object of the present invention is to provide an improved position finder by means of which such point positions may be determined by direct observation and without the necessity of mathematical computation after such observations.

A second important object of the invention is to provide an instrument of this kind wherein the azimuth and hour angles of an observed body may be directly read.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of the invention;

Figure 2 is a plan view thereof;

Figure 3 is a partial side elevation taken substantially at right angles to Figure 1;

Figure 4 is a detail section on the line 4—4 of Figure 2;

Figure 5 is a section on the line 5—5 of Figure 4;

Figure 6 is a detail showing the universal level used herewith in plan;

Figure 7 is a detail showing a rack and pinion adjustment for certain slides used herewith;

Figure 8 is a view partly in elevation and partly in vertical section through the axis of the invention and showing a bowl attachment thereto;

Figure 9 is a plan view of the bowl with the photographic paper therein;

Figure 10 is a detail perspective showing the manner in which the paper is clipped to the bowl;

Figure 11 is an enlarged detail section on the line 11—11 of Figure 8;

Figure 12 is an enlarged view of the central portion of the disc or base 10 and showing one position of the universal level with the bubble centrally of the base; and Figure 13 is a view similar to Figure 12 but showing a certain aperture used therein in central position of the bubble moved off center.

In the embodiment of the invention here shown, there is provided a circular disk or base 10 forming a horizon circle and having a slot 11 formed in its upper surface adjacent and parallel to its periphery. Spaced concentric cover rings 12 and 13 are secured to the base 10 in such a manner as to leave a narrow slot 11. A semi-circular bar 14 is provided with feet 15 which are secured to the base 10 by lugs 16 sliding in said slot 11. The outer ring 12 is graduated in degrees and fractions thereof in any desired manner, and a pointer or index 17 on each of the feet traverses these graduations. By this means the arc 14 may be rotated on a vertical axis over the plate and, by reason of the indices 17 enable the feet to be set at exactly 180 degrees apart so that the center of the arc 14 lies exactly, when thus set, over the center of the base 10. This arc 14 is the azimuth arc of the instrument and is provided with a longitudinal slot 18 which is straddled by a slide 19 having a pin hole 20 in its center. One side of the slide is cut away and provided with a pointer or index 21 (Figs. 3 and 6) which traverses a degree scale marked on the corresponding side of the azimuth arc.

The graduation of the scale on the ring 12 runs from 0 degree in both directions to 180 degrees, and at the 0 degree and 180 degrees points, there is fixed an arc 22 which lies perpendicularly to the base 10 and below the latter except that one end of this arc extends above the base. Each end of this arc is longitudinally slotted as at 23, and in these slots are fitted pivot bolts 24. The pivot bolt in the slot below the base is arranged to carry a semi-circular hour arc 25 which may have a peripheral portion graduated in hours and minutes. An arc 26 is pivoted at diametrically opposite points to the bolts 24 and at one end has a pointer or index 27 which traverses the hour arc 25. The arc 26 swings over the azimuth arc 14 and is provided with a longitudinal slot 28.

On the arc 26 is a slide 29 having a pin hole 30 and provided with a cut-away portion 31 so that a suitable degree and minute scale on the arc 26 may be observed through the opening formed. A pointer or index 32 is carried by the slide in this opening and lies opposite the pin hole 30.

Located centrally of the base is a universal level 33 having the usual bubble 34. The level 33 consists of a highly polished plate to provide a mirrored or reflecting outer surface to permit the location of a star or other similar heavenly body at night when the light therefrom is not strong enough to throw a spot, and is mounted in a series of clips 35 which engage the circular rim of this level and hold it on the plate or base 10 while at the same time permitting the level to be revolved. The level 33 is mounted eccentrically of the plate and the bubble level 34 lies, with the instrument level, eccentrically of the level circle. Nevertheless, when the circle is rotated into one position, such as is shown in circle 12, the bubble 34 lies centrally of the plate. Also the level 33 may be rotated to a second position such as is shown in Figure 13 and when in this second position, a pin hole 36 will lie centrally of the base 10. A north-south line 37 is drawn on the base 10, as is also an east-west line 38 and the level is provided with similar lines, 39 to aid in positioning the pin hole 36 centrally of the plate as can be seen from Figure 13. The horizon circle at the periphery of the plate 10 is provided with spring clips 40 on its underside which engage the flange 41 of a hemispherical bowl adapted to receive a hemispherical piece of photographic paper 42 provided with parallel and meridian lines 43 suitably indexed as at 44. In order to move the slides, such as 19, the arch bars may be provided with rack teeth 46 and the slide may carry a pinion 47 operated by a finger grip 48.

In making observations at night when the light beam from the celestial body is not sufficient to throw a definite light beam, the mirrored plate 33 may be shifted to bring the intersection of the lines 39 and 36 in a center position, such as is shown in Figure 13. The altitude index 19 may be placed in a properly adjusted position on the arc 14 so that when the cross hairs or wires thereof coincide with or register with the cross lines 36 and 39 on the plate 33 and the light from the object appears at the intersection of the lines on the plate 33 and the instrument is also level, the observation has been made. The index 29 may then be properly set according to the United States nautical reading upon the arc 26 and when the index slide hole in this index 29 shows the cross wires in the index 19, and the cross lines 36 and 39 on the plate 33 at their intersection, the reading opposite the pointer 24 on latitude arc 23 shows the latitude of the location or of the observer. This will also cause the pointer 27 to indicate upon the scale 25, the hour angle of the observed body.

In other words, for night reading, any suitable or desired means may be employed without departing from the spirit of the invention to permit the light from the celestial body to be ascertained or observed upon the plate 33 which, as stated above may be either mirrored or highly polished, or in any way provided to permit the celestial body to be observed by means of reflection.

A clamp 35 serves to attach the device to a tripod or other suitable support not deemed necessary here to be shown, it being preferably, however, that such support be provided with the usual levelling means such as is common in surveying and other like instruments and examples of which are shown for instance, in the 13th edition of the Catalog of Eugene Dietzgen Company on pages 406 and 407.

The arc 22 has the end above the base graduated.

The instrument is leveled and is oriented by compass or azimuth of a body till the 0 degree to 180 degrees line of the horizon circle lies north and south. The pivots 24 are shifted to bring the pivot axis substantially parallel to the axis of the earth and this may be done as the approximate latitude will be shown to the observer. The azimuth arc 14 is set on the horizon circle to the azimuth of the observed body as derived from a suitable azimuth table, which may be consulted by referring to the azimuth table published by the Hydrographic Office, Bureau of Navigation, Navy Department. The altitude index 19 is now moved on the arc until light from the body passes through the hole 20 and strikes the center of the bubble when the bubble is on center or level. Next, the hour arc 26 is swung on its pivots until its center line registers with the opening 20. The hour angle will then be shown by the pointer 27 and this is combined with the Greenwich, or other standard meridian, hour angle in the usual manner to obtain the longitude corresponding to the assumed latitude setting of the pivots 24. Change the latitude setting a few degrees and repeat the manipulation of the hour arc. Now plot the two sets of positions found and draw a line through the plotted points. This will be the line of position or Summer line. By repeating the process with another heavenly body, a second line of position, intersecting the first, may be found and the intersection will be the true position.

The purpose of the pin hole 36 is to enable the device to be used when the sun can not be distinctly seen, even on cloudy or misty days when the position of the sun may not be visible to the naked eye, the celestial position of the sun will be recorded upon the sensitized paper. On such occasions the pin hole 36 is brought to the center of the horizon circle and, the instrument being level, the light rays from the sun will pass through the pin hole 36 and strike the sensitive photographic paper 42, the bowl being fitted tightly to the underside of the horizon circle preventing any stray light from affecting the sensitized paper. Under these conditions, the point at which the ray of light from the sun through the pin hole impinges on the sensitized paper will appear as a dot upon development of the photograph, and thereby will indicate the exact altitude of the sun and, if the instrument is pointed true north, will also give the hour angle of the sun from which longitude is figured. By permitting a continuous exposure of the sensitized paper to the sun through the pin-hole 36, the path of travel of the sun throughout the course of a day may be continually recorded.

It will be further observed that when the index 29 is set on arc 26 according to the United States Nautical Almanac reading for the sun's declination for the day of observation, and when the sun's rays pass through the hole in index 29 and are centered on bubble with instrument pointing true north and leveled, then the reading indicated opposite pointer on arc 23 is the exact latitude of the observer and requires no figuring. When instrument is pointed due north and index 29 is set for the United States Nautical Almanac sun's declination and the sun's rays are centered on bubble, there is no change in observer's latitude. Arc 26 when moved from east to west will follow the movement of the sun in the heaven from sun-rise to sun-set, and the rays will always center on the bubble. After the position of the heavenly body has been recorded on the hemispherical piece of photographic paper 42, the paper may, if desired, be placed under the arc 14, and the arc 26 is properly adjusted so that the two sight openings will register with the recorded dot upon the paper 42, thereby designating the correct position at the time the exposure was made upon the paper 42, and from this may be ascertained through proper calculation the latitude and longitude. During this time the instrument must be oriented to point north and leveled for northern latitudes and south for southern latitudes. The papers 42 may be perforated with a pin if desired, to indicate the position of the dot on the reverse side of the paper.

The present invention provides accurate means for determining the true position of the imaginary poles (North and South) from which all measurements on the earth are made. The relative position of the poles is accurately determined by setting the light ray indicator 29 on the hour arc 26 for the Greenwich civil time, and declination of the body being observed and then sliding the hour arc to a position indicating the latitude of the observer upon the latitude arc, and then swinging the hour arc so that the light rays from an observed celestial body are cast upon the center of the azimuth circle. The azimuth circle must be held in a level position. When taking this observation above indicated in the Northern Hemisphere, the elevated pole (note Figure 1) or pivot of the hour arc 26 will indicate the North pole, and the lower pole or pivot of the hour arc 26 will indicate the South pole. In the Southern Hemisphere the poles will be in reverse position.

When the light ray indicator 29 on the hour arc 26 is in registration with the slide 19 or light indicator carried by the altitude arc 14, the reading on the latitude arc indicates the latitude of the observer, and the hour angle indicated by the pointer 27 is the hour angle of the body observed, which, when properly computed, gives the longitude of the observer, the instrument being held due north and south and also being level.

There has thus been provided a simple and efficient device of the kind described and for the purpose specified.

It is obvious that changes may be made in the apparatus without departing from the inventive principles thereof and I reserve as my invention, all forms of the device which come within the scope claimed.

What is claimed is:—

1. An astronomical instrument for locating the position of an observer relative to a selected celestial body comprising means upon which a beam of light is cast from the selected celestial body, leveling means mounted upon said first mentioned means and at a point to receive the light of the beam from the celestial body, means for facilitating the pointing of said last mentioned means due north and south, and means for measuring the angle of the beam as it is cast upon said first mentioned means.

2. In a position finder, an azimuth circle, a latitude arc fixed at the poles of said azimuth circle, polar pivots slidable along said arc, an hour arc pivoted to said polar pivots and provided with means for indicating the passage of a ray of light from an observed body to the center of the azimuth circle, an altitude arc lying in a plane perpendicular to the azimuth circle and adjustable circumferentially thereof, and a slide mounted upon said altitude arc and having a light ray indicator in and for the purpose described.

3. In a position finder, an azimuth circle, a flat member carried by said azimuth circle, said flat member having means upon which a ray of light from a selected celestial body may be cast, said means being in the same plane with said azimuth circle, an hour arc adjustable diametrically of the azimuth circle and mounted for lateral swinging movement, an altitude arc lying in a plane perpendicular to the azimuth circle and adjustable circumferentially of said azimuth circle, said hour arc having means to indicate the passage of a ray of light from an observed body to said first mentioned means, and said altitude arc having a light ray indicator in and for the purpose specified.

4. In a position finder, an azimuth circle, a flat member carried by said azimuth circle, said flat member having means upon which a ray of light from a selected celestial body may be cast, said means being in the same plane with said azimuth circle, an hour arc adjustable diametrically of the azimuth circle and mounted for lateral swinging movement, an altitude arc lying in a plane perpendicular to the azimuth circle and adjustable circumferentially of said azimuth circle, said hour arc having means to indicate the passage of a ray of light from an observed body to said first mentioned means, said altitude arc having a light ray indicator in and for the purpose specified, and an hour angle indicating means carried adjacent said azimuth circle and associated with said hour arc for indicating the hour angle position of the hour arc.

5. In a position finder, an azimuth circle, a flat member supported upon said circle, an altitude arc lying in a plane perpendicular to the azimuth circle and rotated on an axis perpendicular to the plane of the azimuth circle through the center thereof, a light ray indicator slidable upon said altitude arc for the purpose specified, means associated with said light ray indicator and altitude arc arranged to indicate the angle position of the light ray indicator above the azimuth circle, said flat member having a light entrance opening centrally thereof, and a sensitized sheet located below said light entrance opening to record the position of a celestial body at a given time with respect to the position of the observer.

6. In a position finder, an azimuth circle, a flat disc-like plate supported upon said circle and in the same plane therewith, an altitude arc mounted for circumferential adjustment relative to said circle and plate, an altitude index adjustably mounted upon the altitude arc, a latitude arc mounted to extend at substantially right angles to the horizontal plane of said azimuth circle, an hour arc slidably mounted upon said latitude arc, and a light ray indicator slidably mounted upon the hour arc for the purpose specified.

7. In a position finder, an azimuth circle, a flat disc-like plate supported upon said circle and in the same plane therewith, an altitude arc mounted for circumferential adjustment relative to said circle and plate, an altitude index adjustably mounted upon the altitude arc, a latitude arc mounted to extend at substantially right angles to the horizontal plane of said azimuth circle, an hour arc slidably mounted upon said latitude arc, a light ray indicator slidably mounted upon the hour arc for the purpose specified, and a light ray receiving plate carried by said first mentioned plate.

8. In a position finder, an azimuth circle, a flat disc-like plate supported upon said circle and in the same plane therewith, an altitude arc mounted for circumferential adjustment relative to said circle and plate, an altitude index adjustably mounted upon the altitude arc, a latitude arc mounted to extend at substantially right angles to the horizontal plane of said azimuth circle, an hour arc slidably mounted upon said latitude arc, a light ray indicator slidably mounted upon the hour arc for the purpose specified, a light ray receiving plate carried by said first mentioned plate, center indicating means formed upon the light ray receiving plate, and means for supporting said light ray receiving plate whereby said light ray receiving plate may be rotated to change the position of said center indicating means relative to said first mentioned plate.

9. In a position finder, an azimuth circle, a flat disc-like plate carried by said azimuth circle and having means upon which a ray of light from a selected celestial body may be cast, said means being mounted in the same plane with said plate, an altitude arc mounted for adjustment circumferentially of said azimuth circle, an hour arc mounted for adjustment diametrically of said azimuth circle and also mounted for lateral swinging adjustment, and means carried by the altitude arc through which a ray of light from a selected celestial body may pass and be cast upon said plate, and an adjustable sighting slide carried by said hour arc.

10. In a position finder, an azimuth circle, an altitude arc adjustable circumferentially of said azimuth circle, an altitude indicator adjustable upon said altitude arc, a latitude arc carried by said azimuth circle, a pivoted hour arc slidable upon said latitude arc in a direction diametrically of said azimuth circle, an indicator slidable upon said hour arc, means for indicating the hour angle position of the hour angle arc when said altitude indicator and said indicator carried by said hour arc are in registration, and light-sensitive means mounted below the center of the azimuth circle for recording the position of a selected celestial body at a given time with respect to the position of the observer.

11. In a position finder, an azimuth circle, means located at the center of said azimuth circle upon which a ray of light from a selected celestial body may be cast, said means being in substantially the same plane with the azimuth circle, an altitude arc adjustable circumferentially of the azimuth circle, and an hour arc adjustable diametrically of the azimuth circle for the purpose specified.

12. In a position finder, an azimuth circle, an altitude arc adjustable circumferentially of said azimuth circle, an altitude indicator adjustable upon said altitude arc, a latitude arc carried by said azimuth circle, a pivoted hour arc slidable upon said latitude arc in a direction diametrically of said azimuth circle, an indicator slidable upon said hour arc, and means for indicating the hour angle position of the hour angle arc when said altitude indicator and said indicator carried by said hour arc are in registration.

13. In a position finder, an azimuth circle, said azimuth circle carrying means located at the center of said azimuth circle upon which a ray of light from a selected celestial body may be cast, an altitude arc adjustable circumferentially of said azimuth circle, an altitude indicator adjustable upon said altitude arc, a latitude arc carried by said azimuth circle, a pivoted hour arc slidable upon said latitude arc in a direction diametrically of said azimuth circle, an indicator slidable upon said hour arc, and means for indicating the hour angle position of the hour angle arc when said altitude indicator, said indicator carried by said hour arc, and the center of said azimuth circle are in registration and also indicating the latitude on the latitude arc.

14. In a position finder, an azimuth circle, means located at the center of said azimuth circle upon which a ray of light from a selected celestial body may be cast, said means being in the same plane with said azimuth circle, an altitude arc adjustable circumferentially of the azimuth circle, and an altitude indicator adjustably mounted upon said altitude arc.

15. In a position finder, an azimuth circle, means located at the center of said azimuth circle and in the same plane therewith upon which a ray of light from a selected celestial body may be cast, an altitude arc adjustable circumferentially of said azimuth circle, a latitude arc associated with said azimuth circle, an hour arc adjustable upon said latitude arc diametrically of the azimuth circle and also mounted for lateral swinging movement, means for indicating the hour angle position of the hour arc, an altitude index adjustable upon said altitude arc, a light ray indicator adjustable upon the hour arc whereby the reverse angle of a ray of light passing through the altitude index and cast upon the center of the azimuth circle from a selected celestial body may be measured.

16. In a position finder, an azimuth scale, adjustable means mounted within said scale, means located at the center of said adjustable means upon which a ray of light from a selected celestial body may be cast and located in the same plane with the azimuth scale, an altitude indicating means carried by said adjustable means and movable circumferentially of said scale, a latitude indicating means mounted for movement diametrically of said scale, and an hour angle indicating means carried by said last mentioned means.

17. In a position finder, an azimuth circle, an arc fixed at the poles of said azimuth circle, polar pivots slidable along said arc, an hour arc pivoted to said pivots and provided with means to indicate the passage of light from an observed body to the center of the azimuth circle, an hour angle indicating means associated with one of said pivots and the hour arc for indicating the hour angle position of the hour arc.

18. In a position finder, an azimuth circle constituting a base, an altitude arc lying in a plane perpendicular to the azimuth circle and rotatable on an axis perpendicular to the center of the azimuth circle, a slide mounted on said arc and having a light ray indicator whereby the indicator may be interposed between an observed body and the center of the azimuth circle, means associated with the slide and altitude arc arranged to indicate the angular position of the light ray indicator above the azimuth circle and from the meridian of the observer, said last mentioned means comprising an arc fixed at the poles of said azimuth circle, polar pivots slidable along said arc, an hour arc pivoted to said pivots and provided with an indicator to indicate the passage of a ray of light from an observed body to the center of the azimuth circle, said last mentioned indicator being set on said hour arc according to its declination for time and date of the observed body, and indicating means associated with one of said pivots and the hour arc and arranged to indicate the hour angle position of the hour arc when said light ray indicator on said altitude arc and said indicator on said hour arc are in registration with the center of said azimuth circle.

19. In a position finder, an azimuth circle constituting a base, an altitude arc lying in a plane perpendicular to the azimuth circle and rotatable on an axis perpendicular to the plane of the azimuth circle through the center thereof, a slide mounted on said altitude arc and having a light ray indicator whereby the indicator may be interposed between an observed body and the center of the azimuth circle, means associated with the slide and altitude arc arranged to indicate the angular position of the light ray indicator above the azimuth circle, a universal bubble level mounted rotatably and eccentrically of the azimuth circle and having a pin hole therethrough, the rotatable mounting permitting selective positioning of the level bubble and pin hole centrally of the azimuth circle, a hemispherical light-sensitive sheet, and means to support said hemispherical light-sensitive sheet in position beneath and concentric to the azimuth circle, said sheet having meridians and parallels inscribed thereon.

20. In a position finder, an azimuth circle, an arc fixed at the poles of said azimuth circle, polar pivots slidable along said arc, an hour arc pivoted to said pivots and provided with means to indicate the passage of light from an observed body to the center of the azimuth circle, indicating means associated with one of said pivots and the hour arc and arranged to indicate the hour angle position of the hour arc, a universal bubble level mounted rotatably and eccentrically of the azimuth circle and having a pin hole therethrough, the rotatable mounting permitting selective positioning of the level bubble and pin hole centrally of the azimuth circle, a hemispherical light-sensitive sheet, and means to support said hemispherical light-sensitive sheet in position beneath and concentric to the azimuth circle, said sheet having meridians and parallels inscribed thereon.

21. In a position finder, an azimuth circle constituting a base, an altitude arc lying in a plane perpendicular to the azimuth circle and rotatable on an axis perpendicular to the plane of the azimuth circle through the center thereof, a slide mounted on said circle and having a light ray indicator whereby the indicator may be interposed between an observed body and the center of the azimuth circle, means associated with the slide and altitude arc arranged to indicate the angular position of the light ray indicator above the azimuth circle comprising an arc fixed at the poles of said azimuth circle, polar pivots slidable along said arc, an hour arc pivoted to said pivots and provided with means to indicate the passage of light from an observed body to the center of the azimuth circle, indicating means associated with one of said pivots and the hour arc and arranged to indicate the hour angle position of the hour arc, a universal bubble level mounted rotatably and eccentrically of the azimuth circle and having a pin hole therethrough, the rotatable mounting permitting selective positioning of the level bubble and pin hole centrally of the azimuth circle, a hemispherical light-sensitive sheet, and means to support said hemispherical light-sensitive sheet in position beneath and concentric to the azimuth circle, said sheet having meridians and parallels inscribed thereon.

22. In a position finder, an azimuth scale, means located at the center of said azimuth scale upon which a ray of light from a selected celestial body may be cast, said means being in substantially the same plane with the azimuth scale, altitude indicating means adjustable circumferentially of the azimuth scale, and an hour angle indicating means adjustable diametrically of the azimuth scale for the purpose specified.

FREDERICK HAYES HAGNER.